United States Patent [19]

Kegg et al.

[11] 4,203,177
[45] May 20, 1980

[54] CASTOR

[76] Inventors: Jack P. Kegg, 12/104 St. George Crescent, Drummoyne, N.S.W., Australia, 2047; Colin A. Fuller, 25 Awatea Rd., St. Ives, Sydney, N.S.W., Australia, 2075; Geoffrey E. Kegg, 40 Boundary Rd., Wahroonga, Sydney, N.S.W., Australia, 2076

[21] Appl. No.: 926,044

[22] Filed: Jul. 19, 1978

Related U.S. Application Data

[63] Continuation-in-part of Ser. No. 804,114, Jun. 6, 1977, abandoned.

[51] Int. Cl.$^2$ ............................................. B60B 33/08
[52] U.S. Cl. ...................................................... 16/24
[58] Field of Search ........................ 16/24, 30, 20, 21

[56] References Cited

U.S. PATENT DOCUMENTS

| | | | |
|---|---|---|---|
| 9,464 | 12/1852 | Hinton | 16/27 |
| 499,561 | 6/1893 | Morrow | 16/30 |
| 601,726 | 4/1898 | Boveroux | 16/26 |
| 992,290 | 5/1911 | Taylor | 16/27 |

FOREIGN PATENT DOCUMENTS

| | | | |
|---|---|---|---|
| 465480 | 9/1928 | Fed. Rep. of Germany | 16/27 |
| 7835 | of 1838 | United Kingdom | 16/27 |
| 3186 | of 1898 | United Kingdom | 16/26 |
| 264298 | 1/1927 | United Kingdom | 16/27 |

*Primary Examiner*—Werner H. Schroeder
*Assistant Examiner*—Doris L. Troutman
*Attorney, Agent, or Firm*—Nilsson, Robbins, Dalgarn, Berliner, Carson & Wurst

[57] ABSTRACT

A castor comprising a socket member defined by a base portion and a cup portion extending from the base portion, the base portion being adapted to be affixed to the underside of an article, and the cup portion defining a generally dome-shaped cavity therein. A ball is engaged in the cavity in a manner to be freely rotatable in any direction in the cavity. The cup portion has six equally spaced rollers rotatably mounted to the wall of the cavity and supports the ball for rotatable movement within the cavity, the rollers being supported on bearings which in turn are supported on inwardly projecting lugs integral with the cavity walls. The rollers contact the ball at an angle of less than 45° with respect to the horizontal axis of the ball. An annular rim defines an open end of the cavity, through which a portion of the ball outwardly projects, and a circumferential lip is arranged adjacent the annular rim, the lip projecting inwardly towards the surface of the ball, to maintain the ball within the cavity but being resiliently yieldable to permit the ball to be mounted in or removed from the cavity by applying force to the ball.

6 Claims, 13 Drawing Figures

U.S. Patent May 20, 1980 Sheet 2 of 2 4,203,177
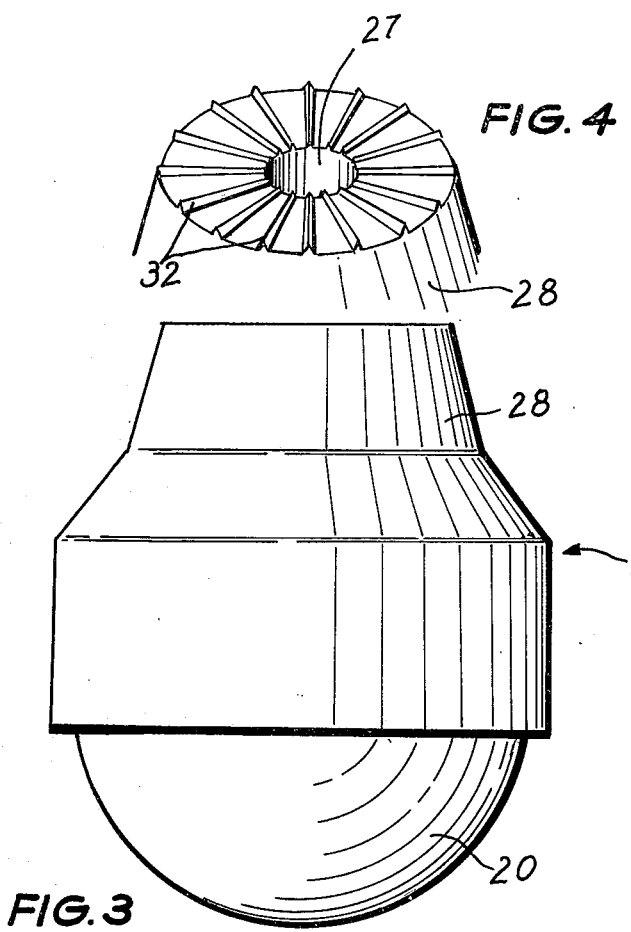

CASTOR

RELATED APPLICATION

This application is a continuation-in-part of U.S. patent application Ser. No. 804,114 filed June 6, 1977, now abandoned.

BACKGROUND OF THE INVENTION

The present invention relates to castors, such as may be used on domestic and office furniture, industrial equipment, trolleys and the like.

The majority of castors in present use are of the swivel-wheel type, essentially comprises a wheel mounted on a horizontal or substantially horizontal axle which in turn is supported for turning about a substantially vertical swivel axis. Such castors, though highly versatile and efficient if well designed, do have certain inherent drawbacks. One drawback is that the bearings, especially the vertical swivel bearings are subject to non-axial forces which tend to accentuate wear and require heavy duty ball or roller bearings if wear is to be minimised and bearing life to be prolonged. Another problem is the need to provide and maintain adequate lubrication for the bearings. A further problem is that since the swivel (vertical) axis is normally offset in a vertical plane with respect to the horizontal axis, any load supported on the castor will generate a turning moment about the vertical axis and thus an extremely rigid connection must be made between the castor and the article to which it is mounted in order to withstand the resulting side forces.

To offset the aforementioned drawbacks, modern swivel castors are ruggedly built with heavy duty bearings and high quality materials. This however makes such castors relatively expensive to manufacture and replace.

Another drawback inherent in a swivel castor is that it will tend to align itself in the particular direction in which it is moving, so that when it is intended to suddenly shift the article through an angle of, say, 90°, the castor will tend to resist this change in direction. Thus, in general, articles mounted on swivel castors are awkward to move around corners.

To overcome the above mentioned drawbacks, a number of so-called "ball-castor" designs have previously been proposed. In this text a ball castor is one in which the main rolling element is a ball as compared with the wheel of a swivel castor. A ball castor is inherently symmetrical and does not require a vertical swivel axis. Furthermore, the load (i.e. weight of article supported on the castor) acts vertically through the axis of the ball and therefore the castor is not subject to large side forces, unlike the case with a swivel castor in which the load does not act vertically through the axis of the wheel. Thus, in principle, a ball castor is free from a number of drawbacks inherent in a swivel castor. On the other hand, there are certain difficulties associated uniquely with the design of a ball castor in practice. A main difficulty is that of supporting the ball in a manner to reduce friction as much as possible, but at the same time to maintain the ball in a stable relationship with its support. This problem arises from the fact that the ball must be capable of rotating freely in any direction about a horizontal axis and thus the means for supporting the ball must be capable of doing so with the least possible friction or resistance to the rotation of the ball. Unlike the wheel of a swivel castor, a ball has no axle or bearings and must be supported solely by some member or members in contact with its surface.

U.S. Pat. No. 78,850 to Wilkinson, patented June 9, 1868 illustrates the simplest possible arrangement for supporting a ball within a socket. This arrangement comprises stationary bearing surfaces which contact the surface of the ball and transmit the load thereto. This arrangement results in excessive friction between the ball and bearing surfaces, since these can only slide with respect to each other. The resultant friction makes it difficult to move the castor on a surface under load and can also cause the ball to jam and stick in its socket. Such a design is therefore incapable of giving a performance comparable to that of a conventional swivel castor.

U.S. Pat. No. 601,726 to Boveroux and patented Apr. 5, 1898 illustrates a castor design in which an attempt has been made to overcome the problem of friction with stationary bearing surfaces, by replacing these with ball bearings in a race. Unfortunately, such an arrangement can only materially reduce friction about the vertical axis of the main ball. The supporting ball bearings cannot significantly reduce rolling friction about a horizontal axis of rotation and therefore this design does not overcome the problem inherent with stationary bearing surfaces.

U.S. Pat. No. 992,290 to Taylor patented May 16, 1911 teaches rollers to support the main ball of a castor and this arrangement significantly improves over the previous designs referred to above. The rollers are supported on horizontal bearings and are arranged about the vertical axis of the ball and support the ball at points of contact near to the top of the ball, within a socket. Such an arrangement cannot eliminate friction, that is, resistance to rolling of the ball, but it can significantly reduce this, in principle, compared with stationary bearing or ball bearing support arrangements. In a roller supported castor as taught by Taylor, it will be seen that for any orientation of the ball rolling axis, the axes of some of the rollers will be aligned (parallel with) or approximately aligned with the ball rolling axis, while the axes of the remainder of the rollers will be substantially out of alignment with, or offset with respect to, the rolling axis of the ball. Those rollers having their axes aligned or substantially aligned with the axis of the ball will tend to roll freely with the ball and thus impose minimum resistance. On the other hand, those rollers with their axes offset with respect to the rolling axis of the ball will tend to slide and contribute maximum resistance to the movement of the ball. The net resistance, therefore, to the rolling of the ball will be determined mainly by the sliding resistance due to those rollers with their axes offset with respect to the rolling axis of the ball. This applies generally to any arrangement utilising rollers to support a castor ball as disclosed also in, for example, U.S. Pat. No. 9464 to Hinton, patented Dec. 14, 1852 and British Pat. No. 264298 to Craymer.

Although in principle the use of rollers for supporting the ball in a ball castor greatly reduces rolling resistance to the ball compared with other methods of support, in practice it has been found exceedingly difficult to reduce rolling resistance sufficiently to the point where the castor can be used on practically any smooth surface without any sticking of the ball in its socket and sliding on the smooth surface. Thus, despite the use of rollers for supporting the ball, the ball has been found to jam or stick in its socket on some smooth surfaces or, under certain loads, there has been a tendency for the ball to be forced to one side of the castor against the inside wall of the castor. At the same time rolling resistance has been relatively high compared with that of a conventional swivel castor and consequently, despite the inherent advantages mentioned previously of the ball castor over a swivel castor, the defects of the known ball castors have been such that their performance has compared unfavourably with that of an ordinary swivel castor.

SUMMARY OF THE INVENTION

An object of the invention is to provide a ball castor in which the ball is supported by six uniformly arranged rollers.

A further object of the invention is to provide a ball castor in which rolling resistance of the ball within a socket is made as low as possible.

Another object of the invention is to provide a ball castor in which tendency for the ball to jam or stick within a castor socket is substantially eliminated.

Yet another object of the invention is to provide a ball castor which can roll smoothly even on smooth surfaces with practically no tendency for the ball to slide on the surfaces.

An additional object of the invention is to provide means whereby the castor can be rapidly and securely fitted to an article of furniture or the like without the need for special tools.

Yet another object of the invention is to provide a novel means for maintaining support rollers within a castor socket.

Yet another object of the invention is to provide a unitary castor housing assembly having a retaining lip to retain a ball within the housing and prevent accumulation of foreign matter within the housing.

BRIEF DESCRIPTION OF DRAWINGS

These and other objects advantages and features of the invention will be more fully explained in the following description taken in conjunction with the accompanying drawings in which:

FIG. 3 is a side elevation of the castor;

FIG. 4 is a perspective view showing the top of the castor;

FIG. 5 is a perspective view of an embodiment for mounting rollers within the castor;

FIG. 6 is a partial view, on an enlarged scale of the device of FIG. 5, showing how the parts are assembled;

FIG. 7 is a schematic representation of a ball supported by six rollers, in which the ball is assumed to roll about axis X—X;

FIG. 8 is a similar representation in which the ball is assumed to roll about axis Y—Y;

FIG. 9 is a further schematic representation to illustrate the effect of angle of contact between the rollers and the ball;

DESCRIPTION OF THE PREFERRED EMBODIMENTS

Figure 1A:
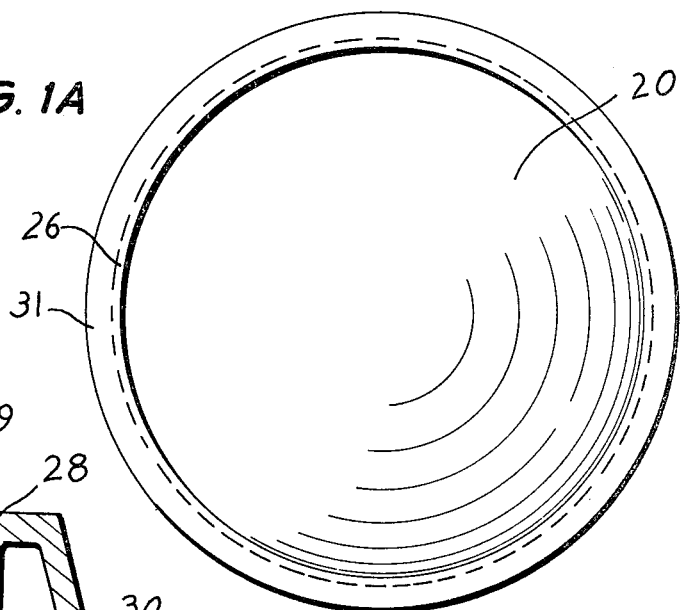
FIG. 1a is a bottom view, of the castor showing a ball retained in its socket.
Figure 1:
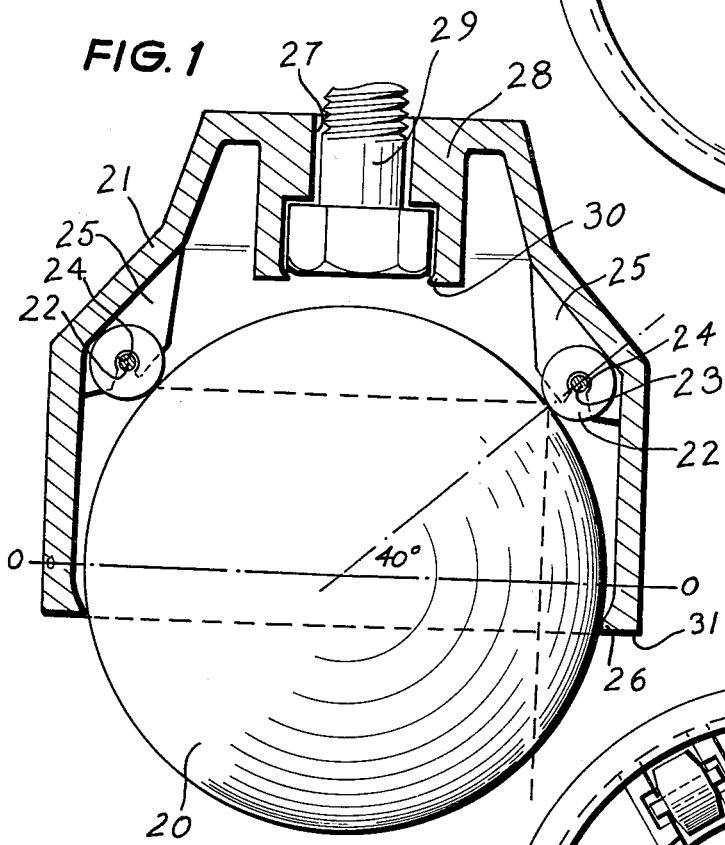
FIG. 1 is a vertical cross section of a castor in accordance with the invention.
Figure 1B:
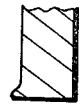
FIG. 1b is a cross section, slightly enlarged, showing a lip for retaining a bolt in the socket.
Figure 1C:
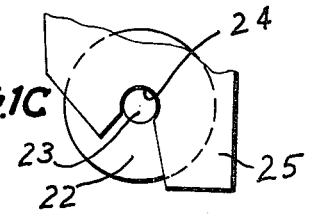
FIG. 1c is a slightly enlarged view of an arrangement for mounting a roller within the socket.
Figure 1D:
FIG. 1d is a slightly enlarged view in cross section, of a lip for retaining the ball in the socket.
Figure 2:
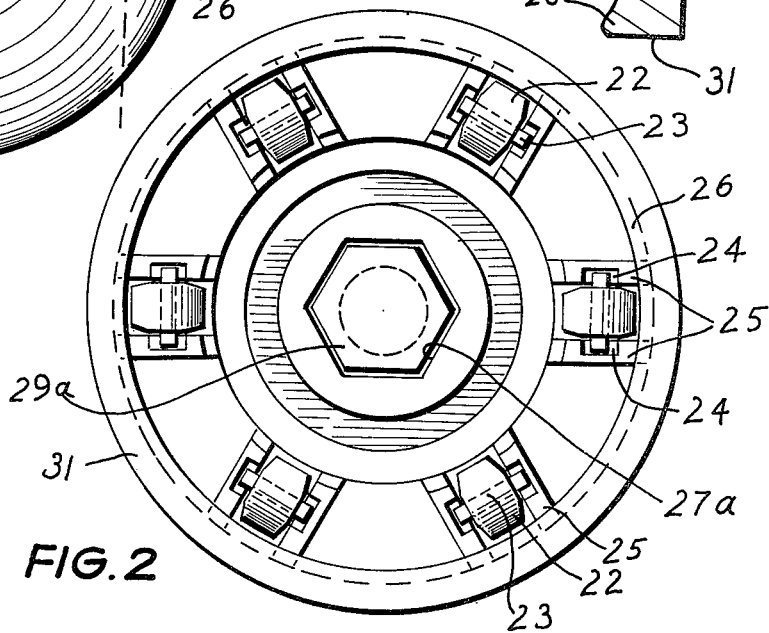
FIG. 2 is a bottom view of the castor, with the ball omitted.

Referring to FIG. 1 of the drawings, a castor comprises a ball 20 mounted in a socket member 21 which is adapted to be fixed to the underside of an article (not shown). Bearing support for the ball 20 is provided by a set of rollers 22, which are symmetrically arranged about the vertical axis of symmetry of the castor and contact the surface of the ball at a position measured at 40°±5° from the horizontal axis O—O of the ball. For reasons subsequently to be made clearer this angle has been found to be relatively critical to the performance of the castor. The rollers 22 comprise six in number, and are uniformly arranged about the vertical axis of the ball. The rollers are mounted on hardened steel axle bearings 23 which are press-fitted into locking recesses 24 formed at either side of each roller in lugs 25 projecting inwardly of the wall of the cavity containing the ball. The roller surfaces are composed of a relatively hard, low coefficient of friction plastics material having self-lubricating properties with respect to the steel bearings 23.

To retain the ball in the cavity, there is provided a continuous lip 26 which projects inwardly towards the ball 20 from a lower rim of the socket member, lip the lip 26 having a diameter slightly less than that of the ball so as to hold the ball in place but being of a yieldable resilient plastics material to permit the ball to be removed and replaced, if necessary, by forcing the ball past the lip.

The socket member has a general dome shape and has an aesthetically attractive appearance. A hole 27 through the centre of the base 28 of the socket member receives a screw or bolt 29 for fastening the castor to the underside of an article 1. The hole 27 is formed with a hexagonally shaped recess 27a which engages a complementarily shaped head 29a of the screw or bolt to prevent the bolt from rotating in the hole. A lip 30 adjacent the mouth of the recess locks the bolt in place. The lip 30 may however be yieldable to enable the bolt to be removed if necessary. Due to the manner of engaging the head 29a in the recess, the need for a tool to fasten the castor to an article is completely eliminated since the bolt or screw can be tightened simply by rotating the castor socket by hand. Instead of a bolt or screw head, the recess may engage a hexagonal nut, to achieve the same advantage. In this case, the castor can be fixed to a bolt (not shown) projecting from the underside of the article to which the castor is to be mounted. Ribs (not shown) may be formed in the base of the socket member and/or the cavity wall so as to provide rigidity combined with low weight and minimum use of material. Due to its construction and the fact that there are no significant bending moments acting on the castor, the castor as a whole has exceptional strength and stability for its weight, especially when compared with conventional swivel castors and thus stability and long life are assured.

The retaining lip 26 preferably does not extend below the bottom edge of the annular rim 31. If the ball is temporarily removed while the castor is affixed to the article (there is no need to remove the socket member when replacing the ball) the castor can be allowed to rest with it annular rim 31 supported on the horizontal surface without danger of bending or damaging the retaining lip 31.

Referring to FIG. 4, this shows the top of the base 28 of the castor, which is formed with radial serrations 32 formed on the top surface. The serrations 32 perform a locking action when the castor is fastened to an article, especially if the article is of wood, so as to resist any motion which might tend to loosen the castor from the article during use.

An advantageous feature of the castor is that the socket comprises a substantially unitary construction which can be moulded in plastics material or cast from metal. Preferably, both for aesthetic reasons and for manufacturing and structural reasons, the castor socket is formed with a substantially dome-shaped configuration, which may have a rounded, hemispherical or polygonal outer surface. The lugs 25 advantageously can be cast or moulded integrally with the castor socket. An important feature of the castor is its simplicity of construction and manufacture. Essentially, assembly of the castor consists of three main steps, namely: 1. Casting or moulding of the socket member, 2. press fitting the axle bearings, with the rollers 22 mounted thereon, into the recesses 24 formed in the lugs 25 and 3. Inserting the ball 20 into the castor cavity.

Referring now to FIGS. 5 and 6, these show an alternative arrangement for mounting the rollers within the castor. FIG. 5 shows an annular cage 33 supporting six uniformly arranged rollers 34 within rectangular slots 35 formed through the walls of the cage. As shown more clearly in FIG. 6, which is an exploded view of a part of the cage assembly, the cage comprises upper and lower annular portions 33a and 33b respectively which fit together in the assembled cage in contact with each other. Each roller 34 is rotatably mounted on an axle bearing 36, the ends of which extend from each end of the roller and seat within depressions 37 formed in the respective portions 33a and 33b. Thus, in the assembled arrangement the ends of the bearings 36 are trapped between the opposing depressions formed in the cage portions, with the roller being free to rotate in the slot 35. The portions 33a and 33b may be held together by adhesive or bending lugs or equivalent means. The cage assembly is mounted in the castor in a simple and rapid manner and can greatly facilitate ease and speed of castor assembly, especially in the production of large numbers of castors.

We have found that in order to obtain satisfactory performance from a "ball castor" a number of factors are important, some being critical. One of the reasons for this is that in principle it is impossible to eliminate friction entirely between the rollers and the ball. Even if absolutely friction-less bearings, for example, were used for the rollers there is always a theoretical finite component of slip between at least some of the rollers and the ball surface at any one time. The performance of the castor will thus be limited by the net sum of the slip resistances contributed by the rollers. By contrast, a conventional swivel castor in theory can be made to have zero rolling resistance, and in practice it is not difficult to achieve results close to such an ideal. However with a ball castor this is another matter. To perform satisfactorily, any castor should be capable of rolling smoothly on a wide variety of surfaces, some of which may be very smooth and slippery. Prior art ball castors would not appear capable of doing so on a smooth surface such as a polished floor without a tendency to slide on such surface rather than roll as they should. This is due to the fact that on such smooth surface slippage resistance at the surface is less than the internal resistances or friction within the castor and this in turn is due to the nature of the rolling and slipping forces acting internally of the castor, and the difficulty of minimising such forces.

One factor which we have found to influence, quite surprisingly, the performance which can be had from a ball castor, is the contact angle of the rollers, that is, the angle made between the points of contact between the rollers and the ball surface with respect to the horizontal axis. Another factor is the number of rollers, in fact six being found to give best results. A further factor is the tolerances between the rollers and their supporting bearings both radially and axially, since poor tolerances in either of these respects have been found to have surprisingly degrading effects on the final performance.

FIGS. 7 and 8 are schematic representations in plan view of a ball 20 supported by six rollers a,b,c,d,e and f. In FIG. 5 the ball is assumed to be rolling about an axis X—X which is parallel with a line passing through rollers a,d. In FIG. 6 the ball is assumed to be rolling about an axis Y—Y which passes between the pairs a,f and c,d. These Figures represent respectively the ball orientations for maximum and minimum resistances to the ball motion.

Referring to FIG. 5 rollers a and d have their axes at a maximum angle of 90° to the axis X—X. At this angle, only slipping between the rollers a and d and the ball surface is possible. Therefore, the friction components by rollers a and d will be the normal sliding friction between the respective surfaces which depends on the particular friction coefficients for the respective materials. For the rollers b,c,e and f, which are at intermediate "offset" angles, there will be a minimum sliding resistance component which depends only on the "offset angle" between the axes of these rollers and/the axis X—X and the materials in question. In addition there is a further component which depends on such factors as bearing friction in the rollers. It has been found that for those rollers at offset angles, the bearing friction is accentuated by side forces acting on the rollers, which in turn are dramatically influenced by the angle of offset, and also the tolerances in the bearings themselves, since poor tolerances will magnify the effective "offset angle" of the rollers (due to sideways "wobble" in the rollers). If, in the arrangement of FIG. 7, bearing friction in the rollers b,c,e and f due to poor tolerances, lack of lubrication and like factors, exceed a critical value, then none of the rollers will rotate, with the result that the ball will stick or slide as if there were no rollers at all. This is a serious defect existing in prior ball castor designs.

In FIG. 8, the axes of the rollers are parallel to the rolling axis Y—Y of the ball, so that in this instance the rollers d and e will roll freely. However the rollers a,c,d, and f are at a large offset angle with respect to the axis Y—Y and thus friction in the bearings of these rollers will have a significant effect on the overall rolling resistance of the ball. If the rollers a,c,d and f are at such a large offset angle so as to cease to roll, then the total friction acting on the ball surface will be about two thirds of the friction that would occur if all of the rollers were replaced by equivalent stationary bearing surfaces.

The actual "offset angle" between the rollers and the ball surface in fact is a function of both the angles $\alpha$ and $\beta$ as indicated schematically in FIGS. 7 and 8 and the angle θ made by the points of contact of the roller and ball surfaces with respect to the horizontal axis of the ball, bearing in mind that the ball is a three dimensional spherical surface and the effective offset angle is an angle measured at that surface. FIG. 9 schematically illustrates the effect of the angle between the points of roller contact and the surface of the ball with respect to the horizontal axis of the ball.

In the drawing θ represents the angle subtended by the radius line from the centre of the ball to the point of contact with each roller measured with respect to the horizontal or equitoral plane (as indicated in the "side view" in FIG. 9). It will be seen that the rollers c and b describe a circular line of contact with the ball as the ball rotates about an axis parallel to the axes a and d. The radius of that circle is a function of the angle θ. There are three major effects determined by the choice of the angle θ as follows:

1. As the ball rolls, there will be a combination of forces acting at the respective points of contact between the rollers and the ball surface. These forces include a vertical component which is a function of the loading on the ball, and a tangential component which represents the reaction forces due to drag between the rollers and the ball, when the rollers are offset with respect to the rolling axis of the ball. The resulting reaction component of these forces will have a magnitude and direction which is dependent upon the angle θ. The horizontal component of this vector represents the tendency for the ball to be shifted sideways, and if the ball is to be prevented from jumping out of the socket, or from being pressed against the wall of the socket, which would result in instability and sticking of the ball, the rollers must at all times be capable of exerting at least an equal and opposing horizontal reaction component. This depends upon, principally, the angle θ. If the angle is too great, that is too close to the pole of the ball, then the ball can very easily jump out of its socket when the castor is moved along a horizontal surface.

2. The radius R' relative to the radius R has an effect on the effective offset angle, which is the angle between the vector component of ball motion at the point of contact with respect to the vector component of roller motion at the same point. The offset angle also is proportional to the displacement angle between any given roller and the direction of movement of the roller as measured in the horizontal plane. For a given displacement angle the actual offset angle will increase with the angle θ and vice versa, so as to be a maximum when θ is (theoretically) 90° and a minimum when θ is 0°. Thus increasing the angle θ results in an increase (which is non linear) in the offset angle with a consequent increase in the drag component exerted by the respective roller.

3. Reducing the angle θ, that is, bringing the rollers closer to the equator reduces the effective offset angle and therefore reduces friction but also increases side thrust exerted by the ball surface against each roller, compared with the vertical reaction forces. If the angle θ is reduced too much, this will result in a tendency for the ball to jam between the rollers.

We have found that the effect of the angle θ is critical to the performance of the castor. As will be clear from the foregoing its selection must of necessity be a compromise between the minimum angle beyond which jamming of the ball is likely to occur and the maximum angle beyond which the rollers may cease to function as such. The importance of the last factor will be appreciated from the explanation given with respect to FIG. 7 which shows that there is a critical situation beyond which none of the rollers may rotate. We have found this maximum critical angle to be about 45°. We have found the minimum useful angle to be about 35°, although this may vary somewhat depending upon the materials used, the nature of the bearings and the magnitude of the load which the castor is intended to support. We have found the preferred angle to be about 40°.

EXAMPLE

A castor constructed in accordance with the invention having a configuration substantially as shown in FIG. 1 of the drawings and having the following dimensions and features.
1. Angle of points of contact of rollers and ball with respect to equatorial plane of ball, 40°.
2. Diameter of ball approximately 2 inches.
3. Diameter of rollers approximately 0.25 inches.
4. Central thickness of rollers approximately 0.2 inches.
5. Peripheral thickness of rollers approximately 0.15 inches.
6. Diameter of axle bearings approximately 0.1 inches.
7. Maximum radial clearance between axle bearing and roller, 0.002 inches.
8. Maximum axial clearance between roller sides and adjacent lug surfaces, 0.005 inches.
9. Castor body moulded in one piece in plastics material.
10. Axle bearings of hardened steel.
11. Rollers of plastic material (nylon) having self lubricating properties with respect to steel.
12. Tested load 100 lbs.
13. Clearance between lip 26 and ball approximately 0.002 inches.

What we claim is:

1. A castor comprising a socket member defined by a base portion and a cup portion extending from the base portion, the base portion being adapted to be affixed to the underside of an article, and the cup portion defining a generally dome-shaped cavity therein, and a ball receivable in the cavity in a manner to be freely rotatable in any direction in the cavity, the cup portion having six equally spaced rollers mounted in a cage in a manner to be arranged uniformly about the wall of the cavity in a plane which is tranverse to the axis of the cavity, whereby to be engageable with the ball and support the latter for rotatable movement within the cavity, the rollers being each supported on an axle which in turn is mounted at each end in complementary retaining portions in the cage, with the rollers being respectively freely rotatable in slots formed through the wall of the cage, the cage being adapted to be supported within the cavity of the socket member with the rotational axis of each roller being generally parallel to the tangent at the point of contact with the surface of the ball and being oblique to the axis of the cavity, while the points of contact between the rollers and the ball being no greater than 45° with respect to the equatorial plane of the ball, the cup portion having an annular rim defining an open end of the cavity through which a portion of the ball, when it is mounted in the cavity, outwardly projects, and means adjacent the annular rim to maintain the ball within the cavity.

2. A castor as claimed in claim 1 in which the cage comprises complementary frusto conical annular members in contact with each other, with the slots passing through the annular members, and the ends of the axles being engaged between the annular portions in opposed depressions formed in the respective portions extending from opposite edges of the slots.

3. A castor as claimed in claim 1 in which the base portion has a serrated top surface for providing resistance against rotation of the socket member when attached to an article.

4. A castor as claimed in claim 1 in which said fastening means comprises a bolt head having a shank passing outwardly of the castor through the hole in the base.

5. A castor as claimed in claim 1 in which each roller is tapered radially outwardly to form a larger central thickness than peripheral thickness.

6. A castor as claimed in claim 1 wherein the rollers make contact with the ball at positions within the range 35° to 45° with respect to the horizontal axis of the ball.

* * * * *